US012633961B2

(12) United States Patent
Hu et al.

(10) Patent No.: US 12,633,961 B2
(45) Date of Patent: May 19, 2026

(54) RADIO FREQUENCY FRONT-END MODULE, ANTENNA DEVICE, AND CONTROL METHOD FOR RADIO FREQUENCY FRONT-END MODULE

(71) Applicant: RadRock (Chongqing) Tech Co., Ltd., Chongqing (CN)

(72) Inventors: Zijie Hu, Shenzhen (CN); Senhang He, Shenzhen (CN); Xu Tian, Shenzhen (CN); Jianxing Ni, Shenzhen (CN)

(73) Assignee: RadRock (Chongqing) Tech Co., Ltd., Chongqing (CN)

( * ) Notice: Subject to any disclaimer, the term of this patent is extended or adjusted under 35 U.S.C. 154(b) by 390 days.

(21) Appl. No.: 18/270,727

(22) PCT Filed: Jan. 24, 2022

(86) PCT No.: PCT/CN2022/073510
§ 371 (c)(1),
(2) Date: Jun. 30, 2023

(87) PCT Pub. No.: WO2022/206146
PCT Pub. Date: Oct. 6, 2022

(65) Prior Publication Data
US 2024/0297680 A1 Sep. 5, 2024

(30) Foreign Application Priority Data

Mar. 31, 2021 (CN) .......................... 202110351974.4

(51) Int. Cl.
*H04B 1/525* (2015.01)
*H04B 1/40* (2015.01)
*H04B 1/44* (2006.01)

(52) U.S. Cl.
CPC ............... *H04B 1/525* (2013.01); *H04B 1/44* (2013.01)

(58) Field of Classification Search
CPC . H04B 1/38; H04B 1/40; H04B 1/401; H04B 1/44; H04B 1/50; H04B 1/525;
(Continued)

(56) References Cited

U.S. PATENT DOCUMENTS 8,644,197 B2 * 2/2014 Lee ...................... H04B 1/0057
455/562.1
9,240,811 B2 * 1/2016 Norholm .................. H04B 1/56
(Continued)

FOREIGN PATENT DOCUMENTS

CN 103780278 A 5/2014
CN 106559100 A 4/2017
(Continued)

OTHER PUBLICATIONS

International Search Report of PCT Patent Application No. PCT/CN2022/073510 issued on Mar. 24, 2022.

*Primary Examiner* — Quochien B Vuong

(57) ABSTRACT

In order to solve the problem that signals often interfere with one another in the RF front-end module in the prior art, the application provides an RF front-end module, an antenna device and a control method for the RF front-end module. The module comprises an antenna switch selection module, an RF signal transmitting link, a first RF signal receiving link and a second RF signal receiving link; the RF signal transmitting link, first RF signal receiving link and second RF signal receiving link are separately connected to a first inner peripheral port, second inner peripheral port and third inner peripheral port respectively. The antenna device and RF front-end module thereof improve the isolation effect. When the RF front-end circuit receives a plurality of RF signals at the same time, the isolation among different RF signals at the antenna switch selection module is higher than that in the prior art.

15 Claims, 5 Drawing Sheets

(58) Field of Classification Search
    CPC ... H04B 1/54; H04B 1/56; H04B 1/10; H04B
                                1/16; H04B 1/1638
    See application file for complete search history.

(56)                     References Cited

U.S. PATENT DOCUMENTS

| | | | |
|---|---|---|---|
| 10,009,058 B2 * | 6/2018 | Khlat | H04B 1/44 |
| 10,749,562 B2 * | 8/2020 | Bai | H04B 1/44 |
| 2008/0080404 A1 | 4/2008 | Kodim | |
| 2016/0093948 A1 | 3/2016 | Lehtola | |

FOREIGN PATENT DOCUMENTS

| | | |
|---|---|---|
| CN | 108199726 A | 6/2018 |
| CN | 111565057 A | 8/2020 |
| CN | 212588326 U | 2/2021 |

* cited by examiner

RADIO FREQUENCY FRONT-END MODULE, ANTENNA DEVICE, AND CONTROL METHOD FOR RADIO FREQUENCY FRONT-END MODULE

This application claims the priority of China Patent Application No. 202110351974.4, filed on Mar. 31, 2021, entitled "Radio frequency front-end module, antenna device, and control method for radio frequency front-end module", the contents of which are incorporated herein by reference in their entirety.

TECHNICAL FIELD

The application relates to that field of wireless communication systems of communication terminal, in particular to an antenna device on communication terminal, and further relates to a radio frequency front-end module in antenna device.

BACKGROUND

With the rapid development of mobile communication technology, wireless communication is realized on communication terminals through built-in antenna devices. With the development and application of the fifth generation mobile communication technology (5G), smart devices, especially the 5G technology in mobile terminals, are facing new challenges. The realization of technical advantages such as faster network transmission speed, greater network carrying capacity and lower network delay in 5G technology requires further optimization of 5G antenna technology. Existing antenna devices generally include baseband module, RF transceiver module, RF front-end module and antenna link module. In the application of 5G technology in mobile terminals, MIMO has become a more important technology.

MIMO is to greatly improve the channel capacity. Multiple antennas are used at both the transmitter and receiver, and a multi-channel antenna system is formed between the transmitter and receiver. However, due to the use of multiple antennas, it can transmit and receive RF signals using 1TNR mode, but when it receives RF signals at the same time, the isolation effect of multiple RF signals at the antenna switch selection module is poor, which often leads to the phenomenon of signal interference.

For example, the structure of the existing common 1T2R is shown in FIG. 1, including an antenna switch selection module 1000, an RF signal composite transceiver link and a second RF signal receiving link C. The antenna switch selection module 1000 includes a switch circuit, an inner peripheral port and an outer peripheral port; the switch circuit is arranged between the inner peripheral port and the outer peripheral port; the inner peripheral port includes a first inner peripheral port 100 and a second inner peripheral port 200; the outer peripheral port includes a first outer peripheral port 101 and a second outer peripheral port 102; the RF signal composite transceiver link includes an RF signal transmitting link A and an RF frequency signal receiving link B; wherein the RF signal composite transceiver link A includes a first filter 10, a power amplifier 11, a first low noise amplifier 12, a first gating switch S1 and a second gating switch S2; the power amplifier 11, the first gating switch S1 and the first filter 10 form the RF signal transmitting link A, which is arranged between the RF signal transmitting port TX and the first inner peripheral port 100; the first low noise amplifier 12, the second gating switch S2 and the first filter 10 form the first RF signal receiving link B, which is arranged between the first RF signal receiving port RX1 and the first inner peripheral port 100; the second RF signal receiving link C includes a second low noise amplifier 13 and a second filter 20, arranged between the second RF signal receiving port RX2 and second inner peripheral port 200; the first outer peripheral port 101 is connected with the first main antenna ANT1; the second outer peripheral port 102 is connected with the second main antenna ANT2. In this way, the RF signal transmitting link A, RF frequency signal receiving link B and second RF signal receiving link C are formed. In the switch circuit of the antenna switch selection module 1000, the first inner peripheral port 100 is connected with the first outer peripheral port 101 and the second outer peripheral port 102 respectively, the second inner peripheral port 200 is connected to second outer peripheral port 102.

The inventor(s) of the present application realized that when the RF front-end module with the above structure is adopted, if the first main antenna ANT1 and the second main antenna ANT2 receive RF signals at the same time (the RF signals received at the same time may be RF signals of the same frequency band or RF signals of different frequency bands), the second gating switch S2 is closed, the first gating switch S1 is turned off, and the first inner peripheral port 100 of the antenna switch selection module 1000 is in communication with the first outer peripheral port 101, the RF signal received by the first main antenna ANT1 is coupled to the first RF signal receiving link B through the first outer peripheral port 101 and the first inner peripheral port 100 of the antenna switch selection module 1000 for signal reception. The second inner peripheral port 200 of the antenna switch selection module 1000 is communicated with the second outer peripheral port 102, when the RF signal received by the second main antenna ANT2 is coupled to the second RF signal receiving link C through the second outer peripheral port 102 and the second inner peripheral port 200 of the antenna switch selection module 1000 for signal reception, due to the poor isolation of the two RF signals at the antenna switch selection module 1000, the phenomenon of signal interference often occurs.

Details of one or more embodiments of the application are set forth in the following descriptions and drawings, and other features and advantages of the application will be apparent from the descriptions, drawings and claims.

SUMMARY

In the prior art, when the RF front-end module receives multiple RF signals at the same time, the isolation degree of the multiple RF signals at the antenna switch selection module is too low, which often leads to mutual interference of signals. In order to solve this problem, this application provides an RF front-end module, an antenna device and a control method for the RF front-end module.

In one aspect, an RF front-end module is provided, including an antenna switch selection module, an RF signal transmitting link, a first RF signal receiving link and a second RF signal receiving link;

the antenna switch selection module includes an inner peripheral port, an outer peripheral port and a switch circuit, the switch circuit is arranged between the inner peripheral port and the outer peripheral port; wherein the inner peripheral port includes a first inner peripheral port, a second inner peripheral port and a third inner peripheral port; the outer peripheral port includes a first outer peripheral port and a second outer peripheral port; the first inner peripheral port is connected with the first outer peripheral port and the second outer peripheral port via the switch circuit, and the second inner peripheral port is connected with the first outer peripheral port via the switch circuit; the third inner peripheral port is connected with the second outer peripheral port via the switch circuit; the first outer peripheral port is used for connecting a first main antenna, and the second outer peripheral port is used for connecting a second main antenna; and the first RF signal transmitting link is connected to the first inner peripheral port, the first RF signal receiving link is connected to the second inner peripheral port, and the second RF signal receiving link is connected to the third inner peripheral port.

Furthermore, the switch circuit includes a first main switch circuit arranged between the first inner peripheral port and the first outer peripheral port, a second main switch circuit arranged between the first inner peripheral port and the second outer peripheral port, a first receiving switch circuit arranged between the second inner peripheral port and the first outer peripheral port, and a second receiving switch circuit arranged between the third inner peripheral port and the second outer peripheral port.

Furthermore, the RF front-end module includes a first working mode; in the first working mode, the first receiving switch circuit is in on state, the second receiving switch circuit is in on state, the first main switch circuit is in off state, and the second main switch circuit is in off state.

Furthermore, the first main switch circuit includes a first main switch, and the first main switch is arranged between the first inner peripheral port and the first outer peripheral port; the second main switch circuit includes a second main switch, and the second main switch is arranged between the first inner peripheral port and the second outer peripheral port.

Furthermore, the first main switch circuit further includes a first pull-down switch circuit, the first pull-down switch circuit is arranged between a connection node of the first main switch and the first outer peripheral port and a ground; the first pull-down switch circuit includes a first pull-down switch, a first matching switch and a first matching resistor;

a first end of the first pull-down switch is connected to a node between the first main switch and the first outer peripheral port, a second end of the first pull-down switch is connected with the first matching switch and the first matching resistor respectively, another end of the first matching switch is connected with the ground, and another end of the first matching resistor is connected with the ground;

the second main switch circuit further includes a second pull-down switch circuit, the second pull-down switch circuit is arranged between a node of the second main switch and the second outer peripheral port and the ground; the second pull-down switch circuit includes a first pull-down switch, a second matching switch and a second matching resistor; and a first end of the second pull-down switch is connected to a node between the second main switch and the second outer peripheral port, a second end of the second pull-down switch is connected with the second matching switch and the second matching resistor respectively, another end of the second matching switch is connected with the ground, and another end of the second matching resistor is connected with the ground.

Furthermore, the first receiving switch circuit includes a first receiving switch and a third pull-down switch, the first receiving switch is arranged between the second inner peripheral port and the first outer peripheral port, and the third pull-down switch is arranged between the second inner peripheral port and the ground.

Furthermore, the second receiving switch circuit includes a second receiving switch and a fourth pull-down switch, the second receiving switch is arranged between the third inner peripheral port and the second outer peripheral port, and the fourth pull-down switch is arranged between the third inner peripheral port and the ground.

Furthermore, the antenna switch selection module further includes a first extension outer peripheral port and a second extension outer peripheral port;

a first extension switch circuit is arranged between the first extension outer peripheral port and the first inner peripheral port, a second extension switch circuit is arranged between the second extension outer peripheral port and the first inner peripheral port;

the first extension switch circuit includes a first extension switch and a fifth pull-down switch; the first extension switch is arranged between the first inner peripheral port and the first extension outer peripheral port, and the fifth pull-down switch is arranged between the first inner peripheral port and the ground; and the second extension switch circuit includes a second extension switch and a sixth pull-down switch; the second extension switch is arranged between the first inner peripheral port and the second extension outer peripheral port, and the sixth pull-down switch is arranged between the first inner peripheral port and the ground.

Furthermore, the antenna switch selection module further includes a first extension inner peripheral port and a second extension inner peripheral port;

a third extension switch circuit is arranged between the first extension inner peripheral port and the first outer peripheral port, a fourth extension switch circuit is arranged between the first extension inner peripheral port and the second outer peripheral port;

a fifth extension switch circuit is arranged between the second extension inner peripheral port and the first outer peripheral port, a sixth extension switch circuit is arranged between the second extension inner peripheral port and the second outer peripheral port;

the third extension switch circuit includes a third extension switch and a seventh pull-down switch; the third extension switch is arranged between the first extension inner peripheral port and the first outer peripheral port, and the seventh pull-down switch is arranged between the first extension inner peripheral port and the ground;

the fourth extension switch circuit includes a fourth extension switch and an eighth pull-down switch; the fourth extension switch is arranged between the first extension inner peripheral port and the second outer peripheral port, and the eighth pull-down switch is arranged between the first extension inner peripheral port and the ground;

the fifth extension switch circuit includes a fifth extension switch and a ninth pull-down switch; the fifth extension switch is arranged between the second extension inner peripheral port and the first outer peripheral port, and the ninth pull-down switch is arranged between the second extension inner peripheral port and the ground; and the sixth extension switch circuit includes a sixth extension switch and a tenth pull-down switch; the sixth extension switch is arranged between the second extension inner peripheral port and the second outer peripheral port, and the tenth pull-down switch is arranged between the second extension inner peripheral port and the ground.

Furthermore, the RF signal transmitting link includes a power amplifier and a first filter, an input end of the power amplifier is connected to an RF signal input port, an output end of the power amplifier is connected to a first end of the first filter, and a second end of the first filter is connected to the first inner peripheral port;

the first RF signal receiving link includes a first low noise amplifier and a second filter; a first end of the second filter is connected to the second inner peripheral port, a second end is connected to an input end of the first low noise amplifier, and an output end of the first low noise amplifier is connected to a first RF signal output end; and the second RF signal receiving link includes a second low noise amplifier and a third filter; a first end of the third filter is connected to the third inner peripheral port, a second end is connected to an input end of the second low noise amplifier, and an output end of the second low noise amplifier is connected to a second RF signal output end.

In a second aspect of the application, an antenna device is provided, including a baseband module, an RF transceiver module, an RF front-end module and an antenna link module; the RF front-end module is described above.

In a third aspect of the application, a control method for the RF front-end module is provided, and the RF front-end module is described above. The method includes the follow steps: receiving a control signal, and controlling the switch circuit according to the control signal, so that the first RF signal transmitting link is in a disconnected mode with the first main antenna and the second main antenna, the first RF frequency signal receiving link is in a connected mode with the first main antenna, and the second RF signal receiving link is in a connected mode with the second main antenna.

Furthermore, the switch circuit includes a first main switch circuit arranged between the first inner peripheral port and the first outer peripheral port, a second main switch circuit arranged between the first inner peripheral port and the second outer peripheral port, a first receiving switch circuit arranged between the second inner peripheral port and the first outer peripheral port, and a second receiving switch circuit arranged between the third inner peripheral port and the second outer peripheral port;

the step of controlling the switch circuit according to the control signal, so that the first RF signal transmitting link is in a disconnected mode with the first main antenna and the second main antenna, the first RF frequency signal receiving link is in a connected mode with the first main antenna, and the second RF signal receiving link is in a connected mode with the second main antenna, includes:

controlling the first receiving switch circuit to be in the on state, the second receiving switch circuit to be in the on state, the first main switch circuit to be in the off state, and the second main switch circuit to be in the off state.

The antenna device and the RF front-end module thereof provided by the application adopt a manner of independently and separately setting the RF signal transmitting link, first RF signal receiving link and second RF signal receiving link. And when the RF signals are received at the same time, for the RF signals received by the first main antenna and the RF signals received by the second main antenna, the isolation is realized by adopting switch in the antenna switch selection module, so that the isolation between them is improved. When the RF front-end circuit receives multiple RF signals at the same time, the isolation effect between different RF signals at the antenna switch selection module is better than that of the RF front-end circuit in the prior art, thus further avoiding the phenomenon of signal interference.

Figure 1:
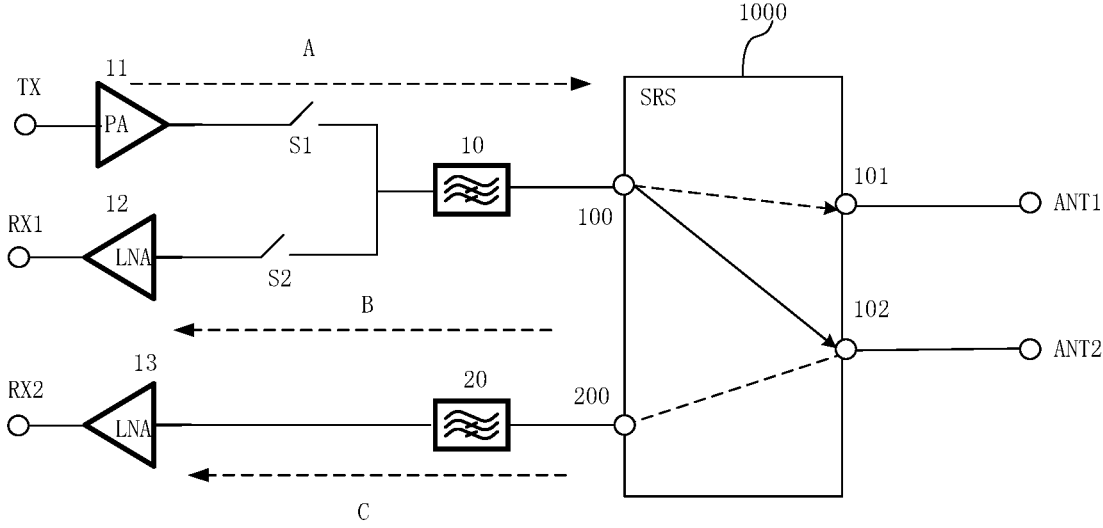
FIG. 1 is a schematic diagram of an RF front-end module provided in the prior art.

Reference signs in the drawings are as follows:

1000. Antenna switch selection module; 10. First filter; 20. Second filter; 30. Third filter; 11. Power amplifier; 12. First low noise amplifier; 13. Second low noise amplifier; 100. First inner peripheral port; 200. Second inner peripheral port; 300. Third inner peripheral port; 101. First outer peripheral port; 102. Second outer peripheral port; TX. RF signal transmitting port; RX1. First RF signal receiving port; RX2. Second RF signal receiving port; ANT1. First main antenna; ANT2. Second main antenna; TRX1. First extension inner peripheral port; TRX2. Second extension inner peripheral port; SRS_Tx1. First extension outer peripheral port; SRS_Tx2. Second extension outer peripheral port; S1. First gating switch; S2. Second gating switch; S11. First main switch; S12. First matching switch; S13. First pull-down switch; R1. First matching resistor; S21. Second main switch; S22. Second matching switch; S23. Second pull-down switch; R2. Second matching resistor; S31. First receiving switch; S32. Third pull-down switch; S41. Second receiving switch; S42. Fourth pull-down switch; S51. First extension switch; S52. Fifth pull-down switch; S61. Second extension switch; S62. Sixth pull-down switch; S71. Third extension switch; S72. Seventh pull-down switch; S81. Fourth extension switch; S82. Eighth pull-down switch; S91. Fifth extension switch; S92. Ninth pull-down switch; ST1. Sixth extension switch; ST2. Tenth pull-down switch.

DETAILED DESCRIPTION OF DISCLOSED EMBODIMENTS

In order to make the technical problems, technical solutions and beneficial effects of the present application more clear, the application will be further explained in detail below with reference to the drawings and embodiments. It should be understood that the specific embodiments described here are only used to illustrate the application, rather than to limit the application.

In the description of the present application, it is to be understood that the terms "longitudinal", "radial", "length", "width", "thickness", "upper", "lower", "front", "rear", "left", "right", "vertical", "horizontal", "top", "bottom", "inner", "outer", and the like indicate an orientation or positional relationship based on that shown in the drawings, and are for convenience of description and simplicity of description only, not intended to indicate or imply that the indicated devices or elements must have a particular orientation, be constructed and operated in a particular orientation, and are therefore not to be construed as limiting the present application.

In the description of the present application, unless otherwise stated, "multiple" means two or more. In the description of the present application, it should be noted that unless otherwise specified and defined, the terms "installation", "connected with" and "connected to" should be understood in a broad sense. For example, they may be fixedly connected, detachably connected or integrally connected, or may be mechanically connected or electrically connected, or may be directly connected or indirectly connected through an intermediate medium. Or it may be internal communication of two elements. For those of ordinary skill in the art, the specific meanings of the above terms in the present application may be understood in specific situations.

This embodiment will specifically explain the communication terminal, antenna device and RF front-end module disclosed in this application. The communication terminal and antenna device of the present application are as described in the background. Communication terminal includes antenna device. Certainly, communication terminal includes not only antenna device, but also other modules, such as processors, user interfaces and memories. Communication terminal is, for example, a personal digital assistant (PDA), a mobile phone, a card in a notebook computer, a wireless tablet computer, etc. The antenna device includes a baseband module, RF transceiver module, RF front-end module and antenna link module, etc. Its overall framework is similar to that described in the background. The antenna device in this embodiment includes a baseband module, RF transceiver module, RF front-end module and antenna link module. The baseband module is used for performing digital baseband signal processing and encoding and decoding the digital baseband signal. The RF transceiver module is used for performing conversion between digital baseband and analog RF signals, processing the digital baseband signals sent by the baseband module into RF analog signals and sending them to the RF front-end module, or receiving the RF analog signals transmitted by the RF front-end module, converting them into digital baseband signals and sending them to the baseband module. The RF front-end module chooses to send RF analog signals to the antenna link module, or receive RF analog signals from the antenna link module, so as to realize amplification, filtering and other processing of the RF analog signals. The antenna link module includes an external antenna to receive or send RF analog signals. The above modules are well known to the public. The main innovative point of this application is to improve the RF front-end module, therefore the baseband module, RF transceiver module, antenna link module and so on are not explained in detail, only the RF front-end module will be explained in detail below.

EMBODIMENTS

Figure 2:
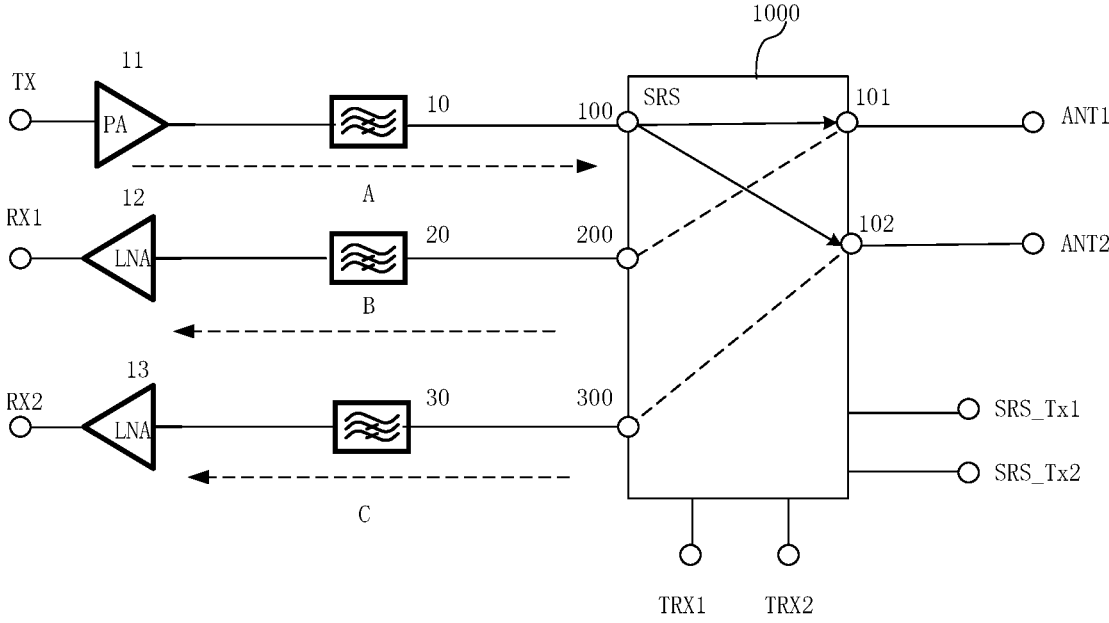
FIG. 2 is a schematic diagram of an RF front-end module and its working principle provided in an embodiment of the present application.

The RF front-end module provided by this application will be explained in detail with the attached drawings, as shown in FIG. 2, including antenna switch selection module 1000, an RF signal transmitting link A, a first RF signal receiving link B and a second RF signal receiving link C.

The antenna switch selection module 1000 includes an inner peripheral port, an outer peripheral port and a switch circuit, the switch circuit is arranged between the inner peripheral port and the outer peripheral port; wherein the inner peripheral port includes a first inner peripheral port 100, a second inner peripheral port 200 and a third inner peripheral port 300; the outer peripheral port includes a first outer peripheral port 101 and a second outer peripheral port 102; the first inner peripheral port 100 is connected with the first outer peripheral port 101 and the second outer peripheral port 102 via the switch circuit, and the second inner peripheral port 200 is connected with the first outer peripheral port 101 via the switch circuit; the third inner peripheral port 300 is connected with the second outer peripheral port 102 via the switch circuit; the first outer peripheral port 101 is used for connecting a first main antenna ANT1, and the second outer peripheral port 102 is used for connecting a second main antenna ANT2; and The RF signal transmitting link A, the first RF signal receiving link B and the second RF signal receiving link C are separately connected to the first inner peripheral port 100, the second inner peripheral port 200 and the third inner peripheral port 300 respectively. That is, the first RF signal transmitting link A is connected to the first inner peripheral port 100, the first RF signal receiving link B is connected to the second inner peripheral port 200, and the second RF signal receiving link C is connected to the third inner peripheral port 300.

Specifically, as shown in FIG. 2, the RF signal transmitting link in this embodiment includes a power amplifier 11 and a first filter 10. The first filter 10 is connected to the first inner peripheral port 100, and an input end of the power amplifier 11 is connected to an RF signal input port. Specifically, the input end of the power amplifier 11 is connected to the RF signal input port, the output end of the power amplifier is connected to the first end of the first filter 10, and the second end of the first filter 10 is connected to the first inner peripheral port 100.

The first RF signal receiving link includes a first low noise amplifier 12 and a second filter 20; the second filter 20 is connected to the second inner peripheral port 200, and an output end of the first low noise amplifier 12 is connected to the first RF signal input end. Specifically, a first end of the second filter 20 is connected to the second inner peripheral port 200, a second end is connected to an input end of the first low noise amplifier 12, and the output end of the first low noise amplifier 12 is connected to the first RF signal output end.

The second RF signal receiving link includes a second low noise amplifier 13 and a third filter 30; the third filter 30 is connected to the third inner peripheral port 300, and an output end of the second low noise amplifier 12 is connected to the second RF signal input end. Specifically, a first end of the third filter 30 is connected to the third inner peripheral port 300, a second end is connected to an input end of the second low noise amplifier 13, and the output end of the second low noise amplifier 13 is connected to the second RF signal output end.

The above-mentioned first low noise amplifier 12 and second low noise amplifier 13 refer to amplifiers with very low noise figure. When amplifying a weak signal, the noise of the amplifier itself may interfere with the signal seriously, so it is hoped to reduce the noise of the amplifier itself to improve the signal-to-noise ratio of the output. The above low noise amplifier is well known to those skilled in the art, which could further amplify the received RF signal and output it to the RF transceiver module. Each of the first low noise amplifier 12 and the second low noise amplifier 13 may be a single chip or integrated into one chip.

Power amplifier 11 is an important part of the RF front-end module, and the output RF signal power in the RF transceiver module is very small. As one of the ports in the RF power amplifier module, the input end of the power amplifier 11 is used to receive the RF signal transmitted by the RF transceiver module. Because the power of the RF signal output by the RF transceiver module is very small, it needs a series of amplification to obtain enough RF power before it can be fed to the antenna for radiation. In order to obtain enough RF output power, power amplifier 11 must be adopted, which is also well known to those skilled in the art and will not be elaborated here.

The first filter 10, second filter 20, and third filter 30 are provided for amplifying RF signals, and filters with different specifications are selected according to the frequency bands that need to pass, so as to determine the RF signals of which frequency bands are allowed to pass, and inhibit the signals of other frequency bands from passing. The selection of filters is well known to those skilled in the art. It may be selected according to the needs of design, and will not be described in detail here. In this embodiment, the above filter may be made as a filter chip or a filter device mounted on a circuit board, or it may be integrated into a filter chip.

Figure 4:
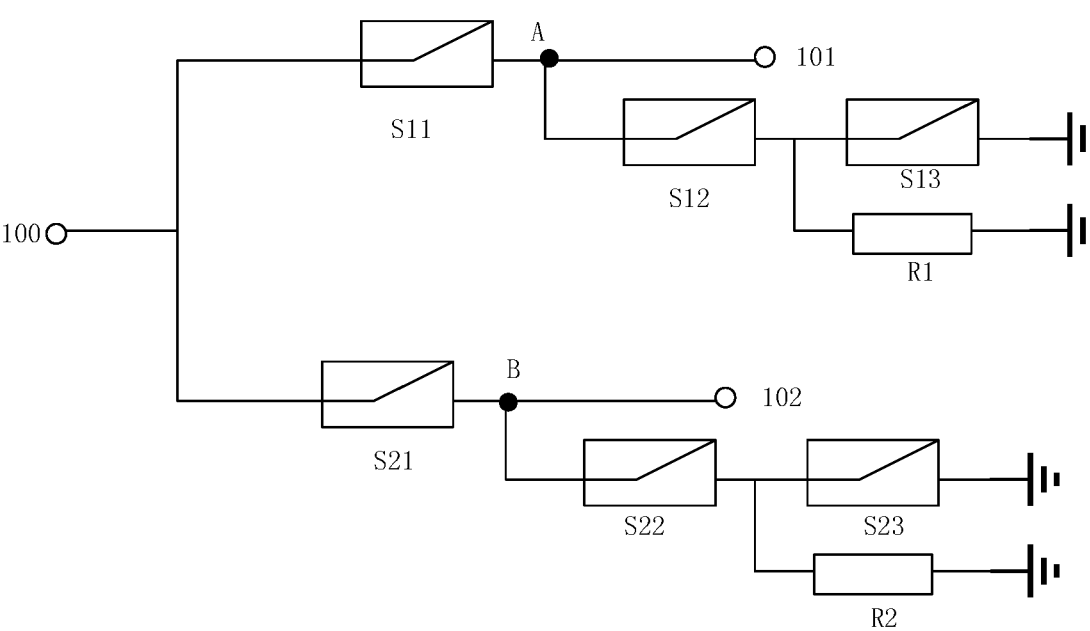
FIG. 4 is a schematic diagram of a further preferred main transmitting switch circuit in an antenna switch selection module provided in an embodiment of the present application.

As shown in FIG. 4, in this embodiment, the switch circuit includes a first main switch circuit arranged between the first inner peripheral port 100 and the first outer peripheral port 101, a second main switch circuit arranged between the first inner peripheral port 100 and the second outer peripheral port 102, a first receiving switch circuit arranged between the second inner peripheral port 200 and the first outer peripheral port 101, and a second receiving switch circuit arranged between the third inner peripheral port 300 and the second outer peripheral port 102.

Specifically, the RF front-end module includes a first working mode; in the first working mode, the first receiving switch circuit is in on state, the second receiving switch circuit is in on state, the first main switch circuit is in off state, and the second main switch circuit is in off state. Understandably, in the first working mode, the first main antenna receives a first RF signal and the second main antenna receives a second RF signal. The first RF signal is coupled to the first RF signal receiving link through the first outer peripheral port 101 and the first receiving switch circuit in the second inner peripheral port 200 of the antenna switch selection module. The second RF signal is coupled to the second RF signal receiving link through the second outer peripheral port 102 and the second receiving switch circuit in the third inner peripheral port 300 of the antenna switch selection module.

Figure 3:
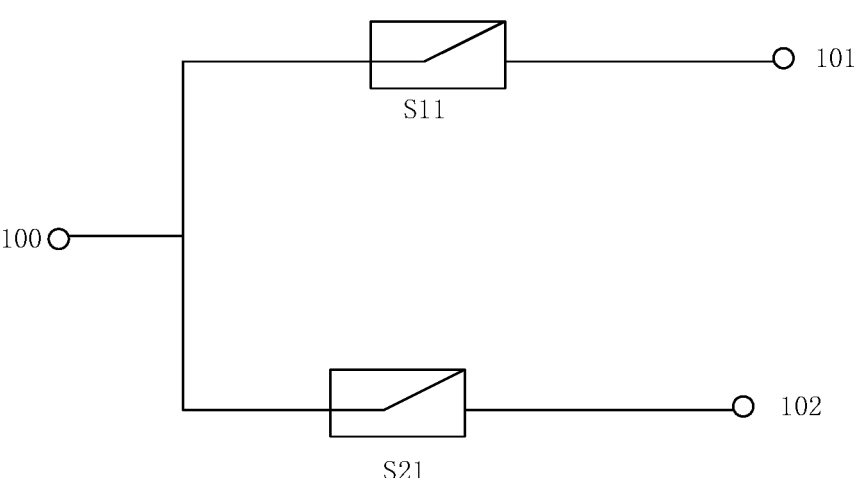
FIG. 3 is a schematic diagram of a main transmitting switch circuit in an antenna switch selection module provided in an embodiment of the present application.

As shown in FIG. 3, the first main switch circuit includes a first main switch S11, and the first main switch S11 is arranged between the first inner peripheral port 100 and the first outer peripheral port 101; the second main switch circuit includes a second main switch S21, and the second main switch S21 is arranged between the first inner peripheral port 100 and the second outer peripheral port 102.

In this way, with the selection of the first main switch S11 and second main switch S21, the RF signal transmitted by the RF signal transmitting port TX may be transmitted to the first main antenna ANT1 or the second main antenna ANT2 through the first inner peripheral port 100, and the first inner peripheral port 100 is selectively connected to the first outer peripheral port 101 or the second outer peripheral port 102.

Further, the first main switch circuit also includes a first pull-down switch circuit, which is arranged between a node (marked as node A) of the first main switch S11 and the first outer peripheral port 101 and the ground; the first pull-down switch circuit includes a first pull-down switch S13, a first matching switch S12 and a first matching resistor R1; a first end of the first pull-down switch S13 is connected to a node between the first main switch S11 and the first outer peripheral port 101, a second end of the first pull-down switch S13 is respectively connected with the first matching switch S12 and the first matching resistor R1, another end of the first matching switch S12 is connected with the ground, and another end of the first matching resistor R1 is connected with the ground. In this way, by closing the first matching switch S12 to connect with the first matching resistor R1, impedance matching of, for example, 50 ohms may be achieved. Isolation is achieved by pulling down the first matching switch S12 to the ground. In this application, in order to achieve impedance matching when the node A is connected to other circuits, the first matching resistor R1 and the first pull-down switch S13 are connected between the first matching switch S12 and the ground, so that impedance matching may be allowed while signal isolation is achieved. When the first main switch S11 is turned off, and the first pull-down switch S13 and the first matching switch S12 are both closed, the RF signal received by the first main antenna ANT1 may be grounded and pulled down, and the RF signal on the second main antenna ANT2 is isolated.

The second main switch circuit further includes a second pull-down switch circuit, the second pull-down switch circuit is arranged between a node (marked as node B) of the second main switch S21 and the second outer peripheral port and the ground; the second pull-down switch circuit includes a second pull-down switch S23, a second matching switch S22 and a second matching resistor R2. A first end of the second pull-down switch S23 is connected to a node between the second main switch S21 and the second outer peripheral port 102, a second end of the second pull-down switch S23 is connected with the second matching switch S22 and the second matching resistor R2 respectively, another end of the second matching switch R2 is connected with the ground, and another end of the second matching resistor R2 is connected with the ground. In this way, the second matching resistor R2 can be connected by closing the second matching switch S22 to achieve impedance matching of, for example, 50 ohms. Isolation is achieved by pulling down the second matching switch S22 to the ground. In this application, in order to achieve impedance matching when the node B is connected to other circuits, the second matching resistor R2 and the second pull-down switch S23 are connected between the second matching switch S22 and the ground, so that impedance matching may be allowed while signal isolation is achieved. When the second main switch S12 is turned off, and the second pull-down switch S23 and the second matching switch S22 are both closed, the RF signal received by the second main antenna ANT2 may be grounded and pulled down, and the RF signal on the second main antenna ANT2 is isolated.

Figure 5:
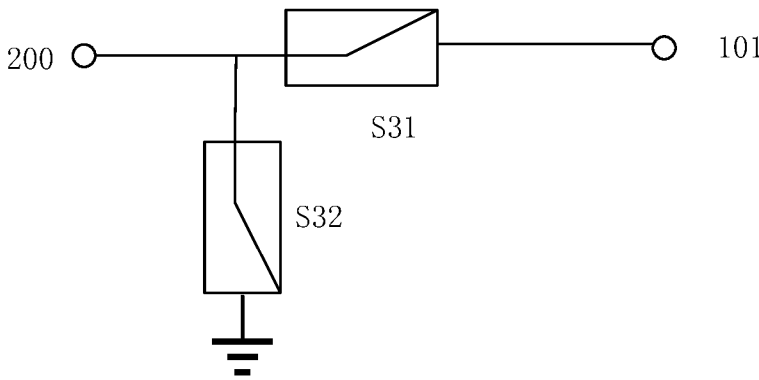
FIG. 5 is a schematic diagram of a first main receiving switch circuit in an antenna switch selection module provided in an embodiment of the present application.

As shown in FIG. 5, the switch circuit includes a first receiving switch circuit arranged at the second inner peripheral port 200 and the first outer peripheral port 101; the first receiving switch circuit includes a first receiving switch S31 and a third pull-down switch S32, the first receiving switch S31 is arranged between the second inner peripheral port 200 and the first outer peripheral port 101, and the third pull-down switch S32 is arranged between the second inner peripheral port 200 and the ground. When the first receiving switch S31 is closed and the third pull-down switch S32 is turned off, the first outer peripheral port 101 and second inner peripheral port 200 are in communication, so that the RF signal received by the first main antenna ANT1 may be transmitted through the first RF signal receiving link. When the first receiving switch S31 is turned off and the third pull-down switch S32 is closed, the RF signal on the first main antenna ANT1 is isolated.

Figure 6:
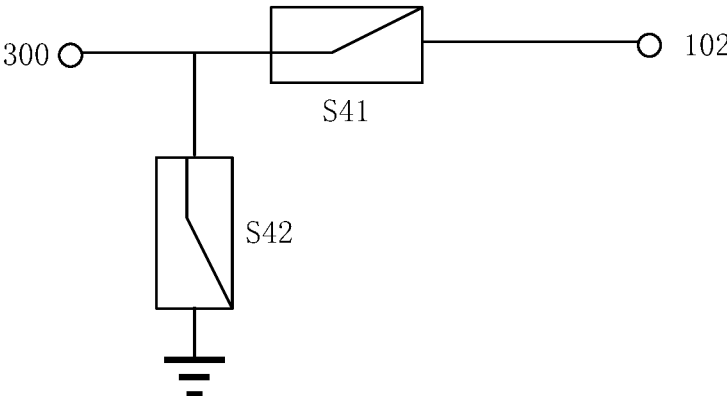
FIG. 6 is a schematic diagram of a second main receiving switch circuit in an antenna switch selection module provided in an embodiment of the present application.

As shown in FIG. 6, the switch circuit includes a second receiving switch circuit arranged at the third inner peripheral port 300 and the second outer peripheral port 102; the second receiving switch circuit includes a second receiving switch S41 and fourth pull-down switch S42, the second receiving switch S41 is arranged between the third inner peripheral port 300 and second outer peripheral port 102, and the fourth pull-down switch S42 is arranged between the third inner peripheral port 300 and the ground. When the second receiving switch S41 is closed and the fourth pull-down switch S42 is turned off, the second outer peripheral port 102 and third inner peripheral port 300 are in communication, so that the RF signal received by the second main antenna ANT2 may be transmitted through the second RF signal receiving link. When the second receiving switch S41 is turned off and the fourth pull-down switch S42 is closed, the RF signal on the second main antenna ANT2 is isolated.

Figure 7:
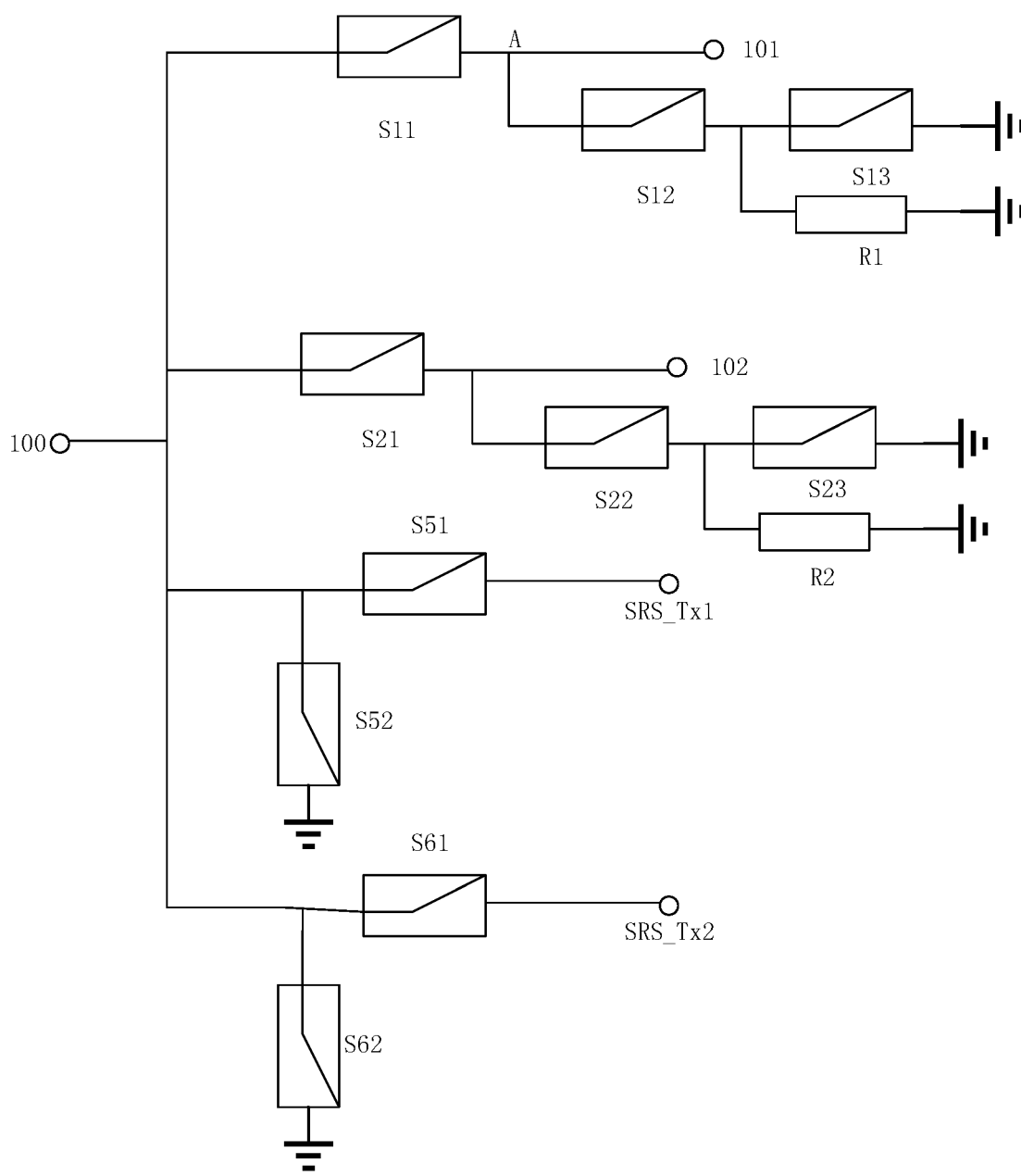
FIG. 7 is a schematic diagram of a peripheral transmitting switch circuit for extending a peripheral antenna port in an antenna switch selection module provided in an embodiment of the present application.

As shown in FIG. 7, the antenna switch selection module 1000 further includes a first extension outer peripheral port SRS_Tx1 and a second extension outer peripheral port SRS_Tx2; the first peripheral extension port and the second peripheral extension port may be used to connect extended peripheral antennas, and the two peripheral antennas may be named as "first peripheral antenna" and "second peripheral antenna" respectively. The first peripheral extension port is connected with the first peripheral antenna, and the second peripheral extension port is connected with the second peripheral antenna.

The first main antenna ANT1, second main antenna ANT2, first peripheral antenna and second peripheral antenna are SRS (Sounding Reference Signal) antennas. Switching of RF signals can be realized using SRS antenna. SRS switching refers to the physical antenna on which the communication terminal sends SRS information. Sending SRS information by the terminal is one of the ways for the base station to detect the terminal position and channel quality. The more antennas being able to participate in transmitting reference signals, the more accurate the channel estimation would be, and the higher the rate could be obtained. If it is only transmitted on a fixed antenna, other antenna information will be lost, and the antenna is not fully utilized, thus it is difficult to obtain the highest rate.

In this embodiment, a first extension switch circuit is arranged between the first extension outer peripheral port SRS_Tx1 and the first inner peripheral port 100, a second extension switch circuit is arranged between the second extension outer peripheral port SRS_Tx2 and the first inner peripheral port 100.

Specifically, the first extension switch circuit includes a first extension switch S51 and a fifth pull-down switch S52; the first extension switch S51 is arranged between the first inner peripheral port 100 and the first extension outer peripheral port SRS_Tx1, and the fifth pull-down switch S52 is arranged between the first inner peripheral port 100 and the ground. When the first peripheral antenna needs to be connected, the first extension switch S51 is closed and the fifth pull-down switch S52 is turned off. When it is not needed to be connected, the first extension switch S51 is turned off, the fifth pull-down switch S52 is closed, and the first peripheral antenna is grounded and isolated.

The second extension switch circuit includes a second extension switch S61 and a sixth pull-down switch S62; the second extension switch S61 is arranged between the first inner peripheral port 100 and the second extension outer peripheral port SRS_Tx2, and the sixth pull-down switch is arranged between the first inner peripheral port 100 and the ground. When the second peripheral antenna needs to be connected, the second extension switch S61 is closed and the sixth pull-down switch S62 is turned off. When it is not needed to be connected, the second extension switch S61 is turned off, the sixth pull-down switch S62 is closed, and the second peripheral antenna is grounded and isolated.

Through the first extension switch circuit and the second extension switch circuit, switching of RF signals on four antennas may be realized.

Figure 8:
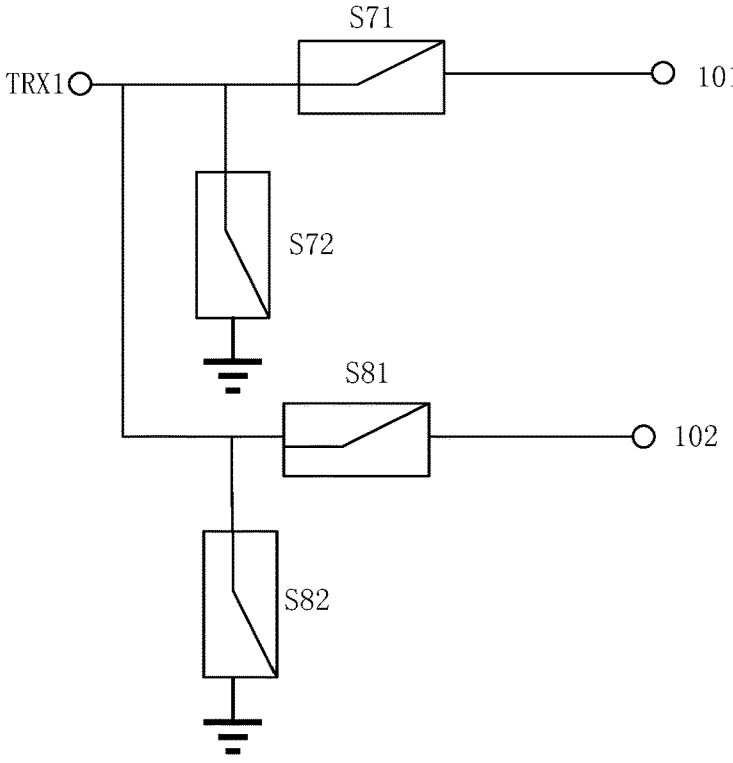
FIG. 8 is a schematic diagram of an inner peripheral transceiver switch circuit of a first extension port in an antenna switch selection module provided in an embodiment of the present application.
Figure 9:
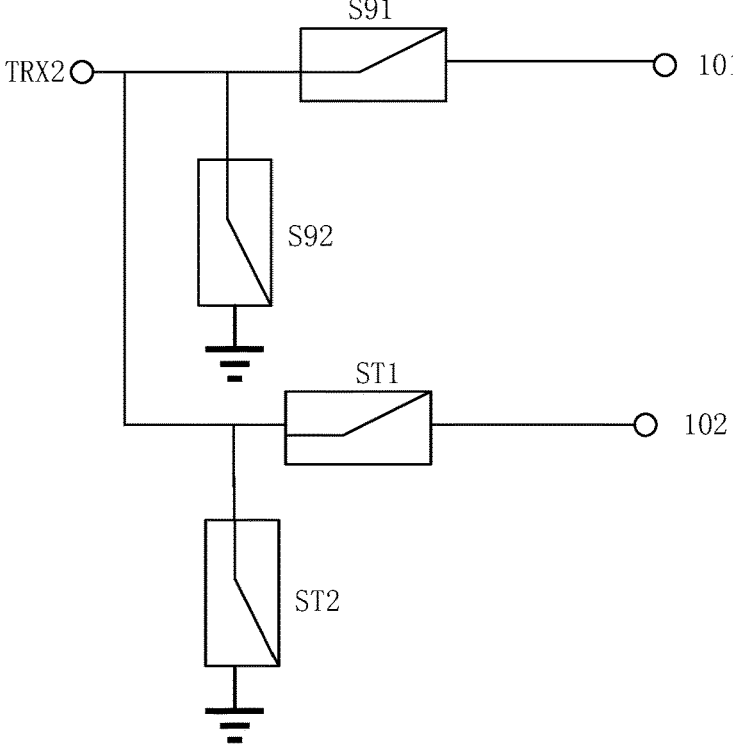
FIG. 9 is a schematic diagram of an inner peripheral transceiver switch circuit of a second extension port in an antenna switch selection module provided in an embodiment of the present application.

As shown in FIGS. 8 and 9, the antenna switch selection module 1000 further includes a first extension inner peripheral port TRX1 and a second extension inner peripheral port TRX2; the first extension inner peripheral port TRX1 and the second extension inner peripheral port TRX2 are used to extend and connect other external RF signal receiving port or RF signal transmitting port TX; by connecting other low noise amplifier or power amplifier 11, and by connecting the first extension inner peripheral port TRX1 and the second extension inner peripheral port TRX2, the connection with the first outer peripheral port 101 and second outer peripheral port 102 can be realized.

In this embodiment, a third extension switch circuit is arranged between the first extension inner peripheral port TRX1 and the first outer peripheral port 101, a fourth extension switch circuit is arranged between the first extension inner peripheral port TRX1 and the second outer peripheral port 102.

A fifth extension switch circuit is arranged between the second extension inner peripheral port TRX2 and the first outer peripheral port 101, a sixth extension switch circuit is arranged between the second extension inner peripheral port TRX2 and the second outer peripheral port 102.

As shown in FIG. 8, the third extension switch circuit includes a third extension switch S71 and a seventh pull-down switch S72; the third extension switch S71 is arranged between the first extension inner peripheral port TRX1 and the first outer peripheral port 101, and the seventh pull-down switch S72 is arranged between the first extension inner peripheral port TRX1 and the ground. When the third extension switch S71 is closed and the seventh pull-down switch S72 is turned off, the first extension inner peripheral port TRX1 and the first outer peripheral port 101 are in communication, the first main antenna ANT1 is connected to the first extension inner peripheral port TRX 1. When the third extension switch S71 is turned off and the seventh pull-down switch S72 is closed, the first main antenna ANT1 is grounded and isolated.

The fourth extension switch circuit includes a fourth extension switch S81 and an eighth pull-down switch S82; the fourth extension switch S71 is arranged between the first extension inner peripheral port TRX1 and the second outer peripheral port 102, and the eighth pull-down switch S82 is arranged between the first extension inner peripheral port TRX1 and the ground. When the fourth extension switch S71 is closed and the eighth pull-down switch S82 is turned off, the first extension inner peripheral port TRX1 and the second outer peripheral port 102 are in communication, the second main antenna ANT2 is connected to the first extension inner peripheral port TRX 1. When the fourth extension switch S81 is turned off and the eighth pull-down switch S82 is closed, the second main antenna ANT2 is grounded and isolated.

The fifth extension switch circuit includes a fifth extension switch S91 and a ninth pull-down switch S92; the fifth extension switch S91 is arranged between the second extension inner peripheral port TRX2 and the first outer peripheral port 101, and the ninth pull-down switch S92 is arranged between the second extension inner peripheral port TRX2 and the ground. When the fifth extension switch S91 is closed and the ninth pull-down switch S92 is turned off, the second extension inner peripheral port TRX2 and the first outer peripheral port 101 are in communication, the first main antenna ANT1 is connected to the second extension inner peripheral port TRX2. When the fifth extension switch S91 is turned off and the ninth pull-down switch S92 is closed, the first main antenna ANT1 is grounded and isolated.

The sixth extension switch circuit includes a sixth extension switch ST1 and a tenth pull-down switch ST2; the sixth extension switch ST1 is arranged between the second extension inner peripheral port TRX2 and the second outer peripheral port 102, and the tenth pull-down switch ST2 is arranged between the second extension inner peripheral port TRX2 and the ground. When the sixth extension switch ST1 is closed and the tenth pull-down switch ST2 is turned off, the second extension inner peripheral port TRX2 and the second outer peripheral port 102 are in communication, the second main antenna ANT2 is connected to the second extension inner peripheral port TRX2. When the sixth extension switch ST1 is turned off and the tenth pull-down switch ST2 is closed, the second main antenna ANT2 is grounded and isolated.

The working process of the preferred RF front-end circuit is as follows:

When the RF signal needs to be transmitted, the RF signal input by RF signal transmitting port TX passes through the RF signal transmitting link, and the antenna switch selection module 1000 selects the first main antenna ANT1 or the second main antenna ANT2 to perform the RF signal switching.

When the RF signal is transmitted via the first main antenna ANT1, the first main switch S11 is closed, the first matching switch S12 and the first pull-down switch S13 are disconnected. The first matching switch S12 and the first pull-down switch S13 in the off state are equivalent to infinite impedances. At this point, the second main switch S21 is turned off.

Similarly, when the RF signal is transmitted via the second main antenna ANT2, the second main switch S21 is closed, the second matching switch S22 and the second pull-down switch S23 are disconnected. The second matching switch S22 and the second pull-down switch S23 in the off state are equivalent to infinite impedances. At this point, the first main switch S11 is turned off.

To achieve 50 ohm impedance matching at node A, the first matching switch S12 is closed, and the first pull-down switch S13 is turned off, the common impedance of the first matching switch S12 and the first matching resistor R1 forms a 50 ohm impedance matching at the node A. If there is no need to achieve 50 ohm impedance matching at node A, or only a small impedance matching is needed, the first matching switch S12 and the first pull-down switch S13 are closed at the same time, and the switch impedance obtained in the closed state is very small. When the first main switch S11 is turned off, and the first matching switch S12 and the first pull-down switch S13 are closed at the same time, it is equivalent to grounding the first outer peripheral port 101, or short-circuiting the RF signal received by the first main antenna ANT1, so as to achieve isolation.

To achieve 50 ohm impedance matching at node A, the first matching switch S12 is closed, and the first pull-down switch S13 is turned off. The RF signal received by first main antenna ANT1 can also be short-circuited to ground to achieve isolation. If there is no need to achieve 50 ohm impedance matching at node B, or only a small impedance matching is needed, the second matching switch S22 and the second pull-down switch S23 are closed at the same time, and the switch impedance obtained in the closed state is very small. When the second main switch S21 is turned off, and the second matching switch S22 and the second pull-down switch S23 are closed at the same time, it is equivalent to grounding the second outer peripheral port 102, or short-circuiting the RF signal received by the second main antenna ANT2, so as to achieve isolation.

The control method for the RF front-end module of the present application is as follows: when the first main antenna ANT1 and the second main antenna ANT2 receive RF signals at the same time (the RF signals received at the same time may be RF signals of the same frequency band or RF signals of different frequency bands), the second inner peripheral port 200 of the antenna switch selection module 1000 is communicated with the first outer peripheral port 101, the RF signal received by the first main antenna ANT1 is coupled to the first RF signal receiving link B for signal reception through the first outer peripheral port 101 of the antenna switch selection module 1000 and the first receiving switch circuit in the second inner peripheral port 200, and transmitted to the first RF signal receiving port RX1. The third inner peripheral port 300 of the antenna switch selection module 1000 is communicated with the second outer peripheral port 102, the RF signal received by the second main antenna ANT2 is coupled to the second RF signal receiving link C for signal reception through the second outer peripheral port 102 of the antenna switch selection module 1000 and the second receiving switch circuit of the third inner peripheral port 300, and transmitted to the second RF signal receiving port RX2.

When the first main antenna ANT1 is selected by the antenna switch selection module 1000 to receive RF signals, the first receiving switch S31 is closed and the third pull-down switch S32 is turned off. When the second main antenna ANT2 is selected by the antenna switch selection module 1000 to receive RF signals, the second receiving switch S41 is closed and the fourth pull-down switch S42 is turned off. At this point, both the first main switch S11 and the second main switch S21 in the antenna switch selection module 1000 are in the off state. The RF signals received by the first main antenna ANT1 and the second main antenna ANT2 cannot interfere with one another through the first main switch S11 and the second main switch S21. That is, if there is signal interference in the first outer peripheral port 101 and the second outer peripheral port 102, the interference signal only cause interference when the first main switch S11 between the first inner peripheral port 100 and second outer peripheral port 102, and the second main switch S21 between the first inner peripheral port 100 and second outer peripheral port 102 are all in communication. That is, it is equivalent to the effect that, the RF signal received by the first main antenna ANT1 and the RF signal received by the second main antenna ANT2 are isolated by using two disconnect switches, thus improving the isolation effect and avoiding the phenomenon of signal interference.

The antenna device and the RF front-end module thereof provided by the embodiment adopt a manner of independently and separately setting the RF signal transmitting link, first RF signal receiving link and second RF signal receiving link. And when the RF signals are received at the same time, for the RF signals received by the first main antenna ANT1 and the RF signals received by the second main antenna ANT2, the isolation is realized by adopting switch in the antenna switch selection module 1000, so that the isolation between them is improved. When the RF front-end circuit receives multiple RF signals at the same time, the isolation effect between different RF signals at the antenna switch selection module 1000 is better than that of the RF front-end circuit in the prior art, thus further avoiding the phenomenon of signal interference.

The embodiment also provides a control method for the RF front-end module, which includes the following steps: receiving a control signal, and controlling the switch circuit according to the control signal, so that the first RF signal transmitting link is in a disconnected mode with the first main antenna and the second main antenna, the first RF frequency signal receiving link is in a connected mode with the first main antenna, and the second RF signal receiving link is in a connected mode with the second main antenna.

The switch circuit includes a first main switch circuit arranged between the first inner peripheral port and the first outer peripheral port, a second main switch circuit arranged between the first inner peripheral port and the second outer peripheral port, a first receiving switch circuit arranged between the second inner peripheral port and the first outer peripheral port, and a second receiving switch circuit arranged between the third inner peripheral port and the second outer peripheral port. The step of controlling the switch circuit according to the control signal, so that the first RF signal transmitting link is in a disconnected mode with the first main antenna and the second main antenna, the first RF frequency signal receiving link is in a connected mode with the first main antenna, and the second RF signal receiving link is in a connected mode with the second main antenna, includes: controlling the first receiving switch circuit to be in the on state, the second receiving switch circuit to be in the on state, the first main switch circuit to be in the off state, and the second main switch circuit to be in the off state.

The above are merely the preferred embodiments of this application, but are not intended to limit the application. Any modification, equivalent substitution and improvement made within the spirit and principle of this application shall be included in the protection scope of this application.

What is claimed is:

1. An RF front-end module, comprising an antenna switch selection module, a first RF signal transmitting link, a first RF signal receiving link and a second RF signal receiving link;

the antenna switch selection module comprises an inner peripheral port, an outer peripheral port and a switch circuit, the switch circuit is arranged between the inner peripheral port and the outer peripheral port; wherein the inner peripheral port comprises a first inner peripheral port, a second inner peripheral port and a third inner peripheral port; the outer peripheral port comprises a first outer peripheral port and a second outer peripheral port; the first inner peripheral port is connected with the first outer peripheral port and the second outer peripheral port via the switch circuit, and the second inner peripheral port is connected with the first outer peripheral port via the switch circuit; the third inner peripheral port is connected with the second outer peripheral port via the switch circuit; the first outer peripheral port is used for connecting a first main antenna, and the second outer peripheral port is used for connecting a second main antenna;

the first RF signal transmitting link is connected to the first inner peripheral port, the first RF signal receiving link is connected to the second inner peripheral port, and the second RF signal receiving link is connected to the third inner peripheral port; the second inner peripheral port is not connected with the second outer peripheral port, and the third inner peripheral port is not connected with the first outer peripheral port;

wherein the switch circuit comprises a first main switch circuit arranged between the first inner peripheral port and the first outer peripheral port, a second main switch circuit arranged between the first inner peripheral port and the second outer peripheral port, a first receiving switch circuit arranged between the second inner peripheral port and the first outer peripheral port, and a second receiving switch circuit arranged between the third inner peripheral port and the second outer peripheral port; and wherein the first receiving switch circuit comprises a first receiving switch and a third pull-down switch, the first receiving switch is arranged between the second inner peripheral port and the first outer peripheral port, and the third pull-down switch is arranged between the second inner peripheral port and the ground.

2. The RF front-end module of claim 1, wherein the RF front-end module comprises a first working mode; in the first working mode, the first receiving switch circuit is in on state, the second receiving switch circuit is in on state, the first main switch circuit is in off state, and the second main switch circuit is in off state.

3. The RF front-end module of claim 1, wherein the first main switch circuit comprises a first main switch, and the first main switch is arranged between the first inner peripheral port and the first outer peripheral port; the second main switch circuit comprises a second main switch, and the second main switch is arranged between the first inner peripheral port and the second outer peripheral port.

4. The RF front-end module of claim 3, wherein the first main switch circuit further comprises a first pull-down switch circuit, the first pull-down switch circuit is arranged between a connection node of the first main switch and the first outer peripheral port and a ground; the second main switch circuit further comprises a second pull-down switch circuit, the second pull-down switch circuit is arranged between a node of the second main switch and the second outer peripheral port and the ground.

5. The RF front-end module of claim 4, wherein the first pull-down switch circuit comprises a first pull-down switch, a first matching switch and a first matching resistor;

a first end of the first matching switch is connected to a node between the first main switch and the first outer peripheral port, a second end of the first matching switch is connected with the first pull-down switch and the first matching resistor respectively, another end of the first pull-down switch is connected with the ground, and another end of the first matching resistor is connected with the ground;

the second pull-down switch circuit comprises a second pull-down switch, a second matching switch and a second matching resistor; and a first end of the second matching switch is connected to a node between the second main switch and the second outer peripheral port, a second end of the second matching switch is connected with the second pull-down switch and the second matching resistor respectively, another end of the second pull-down switch is connected with the ground, and another end of the second matching resistor is connected with the ground.

6. The RF front-end module of claim 1, wherein the second receiving switch circuit comprises a second receiving switch and a fourth pull-down switch, the second receiving switch is arranged between the third inner peripheral port and the second outer peripheral port, and the fourth pull-down switch is arranged between the third inner peripheral port and the ground.

7. The RF front-end module of claim 1, wherein the antenna switch selection module further comprises a first extension outer peripheral port and a second extension outer peripheral port; and a first extension switch circuit is arranged between the first extension outer peripheral port and the first inner peripheral port, a second extension switch circuit is arranged between the second extension outer peripheral port and the first inner peripheral port;

the first extension switch circuit comprises a first extension switch and a fifth pull-down switch; when the first peripheral antenna needs to be connected, the first extension switch is closed and the fifth pull-down switch is turned off; when the first peripheral antenna does not need to be connected, the first extension switch is turned off and the fifth pull-down switch is closed; and the second extension switch circuit comprises a second extension switch and a sixth pull-down switch; when the second peripheral antenna needs to be connected, the second extension switch is closed and the sixth pull-down switch is turned off; when the second peripheral antenna does no need to be connected, the second extension switch is turned off and the sixth pull-down switch is closed.

8. The RF front-end module of claim 7, wherein the first extension switch is arranged between the first inner peripheral port and the first extension outer peripheral port, and the fifth pull-down switch is arranged between the first inner peripheral port and the ground; and the second extension switch is arranged between the first inner peripheral port and the second extension outer peripheral port, and the sixth pull-down switch is arranged between the first inner peripheral port and the ground.

9. The RF front-end module of claim 1, wherein the antenna switch selection module further comprises a first extension inner peripheral port and a second extension inner peripheral port;

a third extension switch circuit is arranged between the first extension inner peripheral port and the first outer peripheral port, a fourth extension switch circuit is arranged between the first extension inner peripheral port and the second outer peripheral port;

a fifth extension switch circuit is arranged between the second extension inner peripheral port and the first outer peripheral port, a sixth extension switch circuit is arranged between the second extension inner peripheral port and the second outer peripheral port;

the third extension switch circuit comprises a third extension switch and a seventh pull-down switch; the third extension switch is arranged between the first extension inner peripheral port and the first outer peripheral port, and the seventh pull-down switch is arranged between the first extension inner peripheral port and the ground;

the fourth extension switch circuit comprises a fourth extension switch and an eighth pull-down switch; the fourth extension switch is arranged between the first extension inner peripheral port and the second outer peripheral port, and the eighth pull-down switch is arranged between the first extension inner peripheral port and the ground;

the fifth extension switch circuit comprises a fifth extension switch and a ninth pull-down switch; the fifth extension switch is arranged between the second extension inner peripheral port and the first outer peripheral port, and the ninth pull-down switch is arranged between the second extension inner peripheral port and the ground; and the sixth extension switch circuit comprises a sixth extension switch and a tenth pull-down switch; the sixth extension switch is arranged between the second extension inner peripheral port and the second outer peripheral port, and the tenth pull-down switch is arranged between the second extension inner peripheral port and the ground.

10. The RF front-end module of claim 1, wherein the RF signal transmitting link comprises a power amplifier and a first filter, an input end of the power amplifier is connected to an RF signal input port, an output end of the power amplifier is connected to a first end of the first filter, and a second end of the first filter is connected to the first inner peripheral port;

the first RF signal receiving link comprises a first low noise amplifier and a second filter; a first end of the second filter is connected to the second inner peripheral port, a second end is connected to an input end of the first low noise amplifier, and an output end of the first low noise amplifier is connected to a first RF signal output end; and the second RF signal receiving link comprises a second low noise amplifier and a third filter; a first end of the third filter is connected to the third inner peripheral port, a second end is connected to an input end of the second low noise amplifier, and an output end of the second low noise amplifier is connected to a second RF signal output end.

11. An antenna device, comprising a baseband module, an RF transceiver module, an RF front-end module and an antenna link module; the RF front-end module comprises an antenna switch selection module, an RF signal transmitting link, a first RF signal receiving link and a second RF signal receiving link;

the antenna switch selection module comprises an inner peripheral port, an outer peripheral port and a switch circuit, the switch circuit is arranged between the inner peripheral port and the outer peripheral port; wherein the inner peripheral port comprises a first inner peripheral port, a second inner peripheral port and a third inner peripheral port; the outer peripheral port comprises a first outer peripheral port and a second outer peripheral port; the first inner peripheral port is connected with the first outer peripheral port and the second outer peripheral port via the switch circuit, and the second inner peripheral port is connected with the first outer peripheral port via the switch circuit; the third inner peripheral port is connected with the second outer peripheral port via the switch circuit; the first outer peripheral port is used for connecting a first main antenna, and the second outer peripheral port is used for connecting a second main antenna;

the first RF signal transmitting link is connected to the first inner peripheral port, the first RF signal receiving link is connected to the second inner peripheral port, and the second RF signal receiving link is connected to the third inner peripheral port; the second inner peripheral port is not connected with the second outer peripheral port, and the third inner peripheral port is not connected with the first outer peripheral port;

wherein the switch circuit comprises a first main switch circuit arranged between the first inner peripheral port and the first outer peripheral port, a second main switch circuit arranged between the first inner peripheral port and the second outer peripheral port, a first receiving switch circuit arranged between the second inner peripheral port and the first outer peripheral port, and a second receiving switch circuit arranged between the third inner peripheral port and the second outer peripheral port;

wherein the first main switch circuit comprises a first main switch, and the first main switch is arranged between the first inner peripheral port and the first outer peripheral port;

the second main switch circuit comprises a second main switch, and the second main switch is arranged between the first inner peripheral port and the second outer peripheral port; and wherein the first main switch circuit further comprises a first pull-down switch circuit, the first pull-down switch circuit is arranged between a connection node of the first main switch and the first outer peripheral port and a ground: the second main switch circuit further comprises a second pull-down switch circuit, the second pull-down switch circuit is arranged between a node of the second main switch and the second outer peripheral port and the ground.

12. The antenna device of claim 11, wherein the RF front-end module comprises a first working mode; in the first working mode, the first receiving switch circuit is in on state, the second receiving switch circuit is in on state, the first main switch circuit is in off state, and the second main switch circuit is in off state.

13. The antenna device of claim 11, wherein the first receiving switch circuit comprises a first receiving switch and a third pull-down switch, the first receiving switch is arranged between the second inner peripheral port and the first outer peripheral port, and the third pull-down switch is arranged between the second inner peripheral port and the ground; and the second receiving switch circuit comprises a second receiving switch and a fourth pull-down switch, the second receiving switch is arranged between the third inner peripheral port and the second outer peripheral port, and the fourth pull-down switch is arranged between the third inner peripheral port and the ground.

14. The antenna device of claim 11, wherein the first pull-down switch circuit comprises a first pull-down switch, a first matching switch and a first matching resistor;

a first end of the first pull-down switch is connected to a node between the first main switch and the first outer peripheral port, a second end of the first pull-down switch is connected with the first matching switch and the first matching resistor respectively, another end of the first matching switch is connected with the ground, and another end of the first matching resistor is connected with the ground;

the second pull-down switch circuit comprises a first pull-down switch, a second matching switch and a second matching resistor; and a first end of the second pull-down switch is connected to a node between the second main switch and the second outer peripheral port, a second end of the second pull-down switch is connected with the second matching switch and the second matching resistor respectively, another end of the second matching switch is connected with the ground, and another end of the second matching resistor is connected with the ground.

15. An RF front-end module, used in an antenna device, comprising an antenna switch selection module, a first RF signal transmitting link, a first RF signal receiving link and a second RF signal receiving link;

the antenna switch selection module comprises an inner peripheral port, an outer peripheral port and a switch circuit, the switch circuit is arranged between the inner peripheral port and the outer peripheral port; wherein the inner peripheral port comprises a first inner peripheral port, a second inner peripheral port and a third inner peripheral port; the outer peripheral port comprises a first outer peripheral port and a second outer peripheral port; the first inner peripheral port is connected with the first outer peripheral port and the second outer peripheral port via the switch circuit, and the second inner peripheral port is connected with the first outer peripheral port via the switch circuit; the third inner peripheral port is connected with the second outer peripheral port via the switch circuit; the first outer peripheral port is used for connecting a first main antenna, and the second outer peripheral port is used for connecting a second main antenna; and the first RF signal transmitting link is connected to the first inner peripheral port, the first RF signal receiving link is connected to the second inner peripheral port; and the first RF signal receiving link is not configured to receive RF signals through the second outer peripheral port; the second RF signal receiving link is connected to the third inner peripheral port, and the second RF signal receiving link is not configured to receive RF signals through the first outer peripheral port;

wherein the switch circuit comprises a first main switch circuit arranged between the first inner peripheral port and the first outer peripheral port, a second main switch circuit arranged between the first inner peripheral port and the second outer peripheral port, a first receiving switch circuit arranged between the second inner peripheral port and the first outer peripheral port, and a second receiving switch circuit arranged between the third inner peripheral port and the second outer peripheral port; and wherein the first receiving switch circuit comprises a first receiving switch and a third pull-down switch, the first receiving switch is arranged between the second inner peripheral port and the first outer peripheral port, and the third pull-down switch is arranged between the second inner peripheral port and the ground.

* * * * *